United States Patent [19]

Hughes

[11] Patent Number: 5,402,967
[45] Date of Patent: Apr. 4, 1995

[54] APPARATUS FOR SUPPLYING WATER TO AIRCRAFT CABIN SPRAY SYSTEMS

[75] Inventor: Grenville Hughes, Tucson, Ariz.

[73] Assignee: AlliedSignal Inc., Morris Township, Morris County, N.J.

[21] Appl. No.: 930,640

[22] Filed: Aug. 17, 1992

[51] Int. Cl.⁶ .............................................. B64D 45/00
[52] U.S. Cl. ................................ 244/129.2; 169/62; 244/118.5; 62/402
[58] Field of Search .................... 244/118.5, 189.2; 169/62; 62/402; 454/71

[56] References Cited

U.S. PATENT DOCUMENTS

| | | | |
|---|---|---|---|
| Re. 32,100 | 4/1986 | Rannenberg | 62/402 |
| 2,479,766 | 8/1949 | Mulvany | 244/118.5 |
| 2,979,916 | 4/1961 | Mason | 454/71 |
| 4,014,179 | 3/1977 | Iles et al. | 62/402 |
| 4,018,060 | 4/1977 | Kinsell et al. | 62/402 |
| 4,262,495 | 4/1981 | Gupta et al. | 62/402 |
| 4,312,191 | 1/1982 | Biagini | 62/402 |
| 4,829,775 | 5/1989 | Defrancesco | 62/402 |
| 5,040,611 | 8/1991 | Steel | 169/62 |
| 5,052,493 | 10/1991 | Court | 169/62 |

FOREIGN PATENT DOCUMENTS

| | | | |
|---|---|---|---|
| 2166542 | 5/1986 | United Kingdom | 244/118.5 |
| 2181050 | 4/1987 | United Kingdom | 169/62 |

OTHER PUBLICATIONS

Aircraft Cabin Water Spray by David Ball Article from Flight International Feb. 11, 1992 entitled "Damping".

Primary Examiner—Michael S. Huppert
Assistant Examiner—Anne E. Bidwell
Attorney, Agent, or Firm—Hugh P. Gortler; Robert A. Walsh

[57] ABSTRACT

A cabin spray system of an aircraft is supplied with water channeled from the aircraft's environmental control system. The channeled water can be stored in a tank containing potable water. The ECS water would replace the potable water removed.

12 Claims, 3 Drawing Sheets

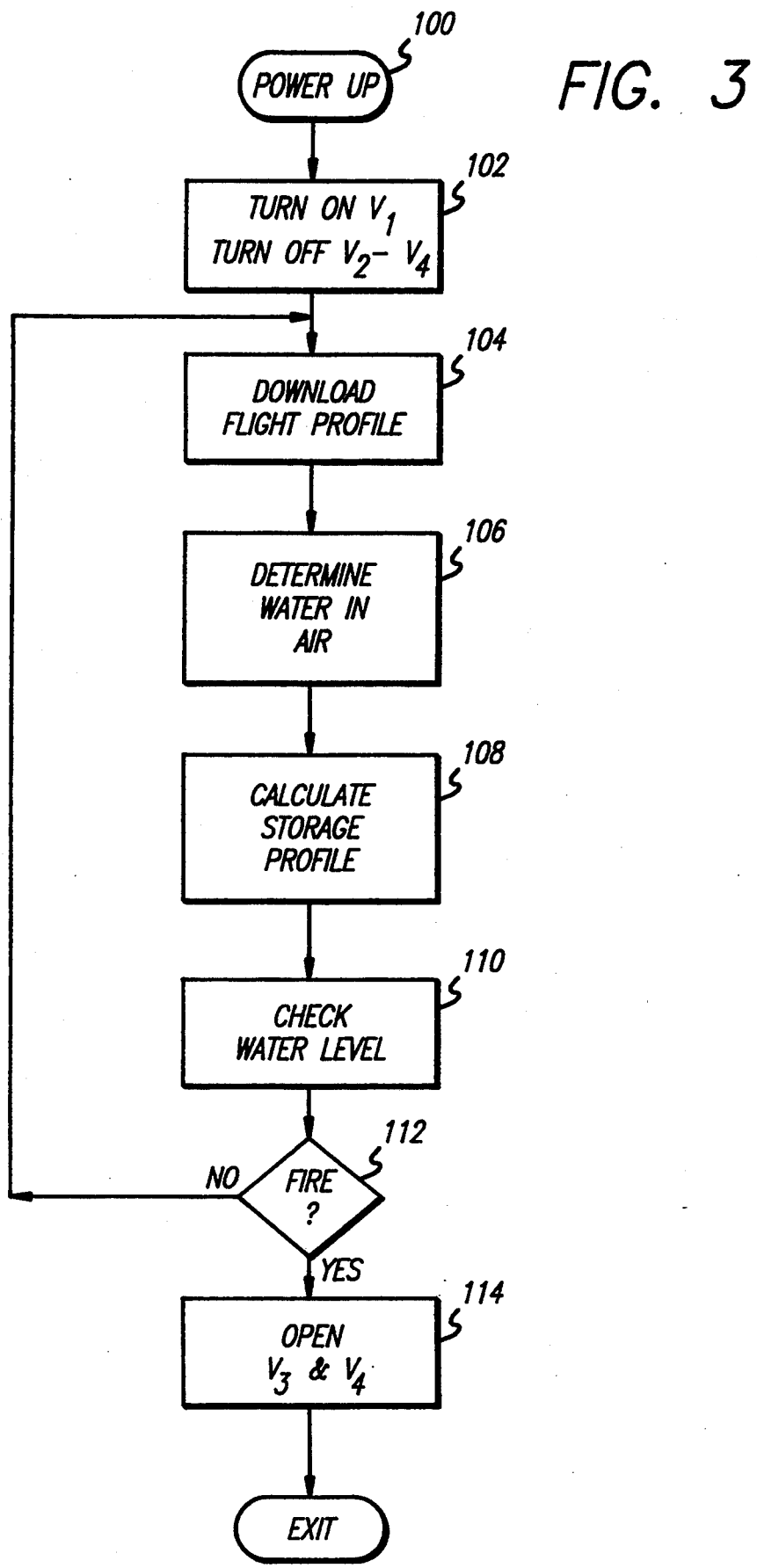

APPARATUS FOR SUPPLYING WATER TO AIRCRAFT CABIN SPRAY SYSTEMS

BACKGROUND OF THE INVENTION

This invention relates in general to fire prevention systems and in particular to a spray system for aircraft cabins.

In August of 1985, a British Airtours Boeing 737 aborted its takeoff following an uncontained engine failure which pierced the wing fuel tanks and destroyed the fuselage. Tragically, heat and fumes overcame the fifty five passengers before they could evacuate the aircraft. Had the aircraft's cabin been equipped with a spray system, the passengers might have had enough time to escape.

A cabin spray system sprays a fine mist of water throughout the cabin or directly on the fire. The mist slows the spread of fire and reduces the heat and smoke in the cabin. A series of water tanks 2 are connected to center and outboard spray nozzles 4 and 6 distributed throughout the cabin 8 (see FIG. 1). The system is triggered either manually (e.g., by a member of the cabin crew) or automatically (e.g., by a thermal detection system). Once triggered, the system buys significant time for the passengers to evacuate the burning aircraft.

A relatively small amount of water is required. The amount depends upon duration that the system is required to operate, size of the aircraft, and other factors such as cabin air currents and temperature. Since most evacuations are completed within three and a half minutes, the system would have to operate for at least three minutes. According to an article entitled "Damping Down the Fires" in Flight International, a three minute discharge would require 270 liters of water for narrowbodies (e.g., Boeing 737) and 740 liters for widebodies (e.g., Airbus A300).

Even though used in small amounts, the water adds weight to the airframe. The extra weight, in turn, decreases fuel consumption, adding to the cost of operating the aircraft.

The aforementioned article suggests several ways in which the cost of storing water can be reduced. For example, the tanks can be eliminated by storing water instead of halon in cargo-hold fire-suppression systems. Or, the spray system could use ballast water stored in the airframe.

The article also mentions that the aircraft's potable, or drinkable, water supply can be used instead of dedicated tanks. However, the article advises against this approach because the water would be consumed during flight. Because roughly two-thirds of the accidents occur after takeoff, little water, if any, would be available to the cabin spray system at landing.

It is an object of this invention to reduce the cost of storing water for a cabin spray system.

SUMMARY OF THE INVENTION

A cabin spray system is supplied with ECS water stored by apparatus according to this invention. The apparatus comprises channeling means for channeling water from the aircraft's ECS; and storing means for storing the channeled ECS water.

BRIEF DESCRIPTION OF THE DRAWINGS

FIG. 3 is a flowchart of control logic for a control unit which forms a part of the apparatus shown in FIG. 2; and FIG. 4 is a schematic view of an alternate embodiment of the apparatus shown in FIG. 2.

DETAILED DESCRIPTION OF THE INVENTION

Figure 1:
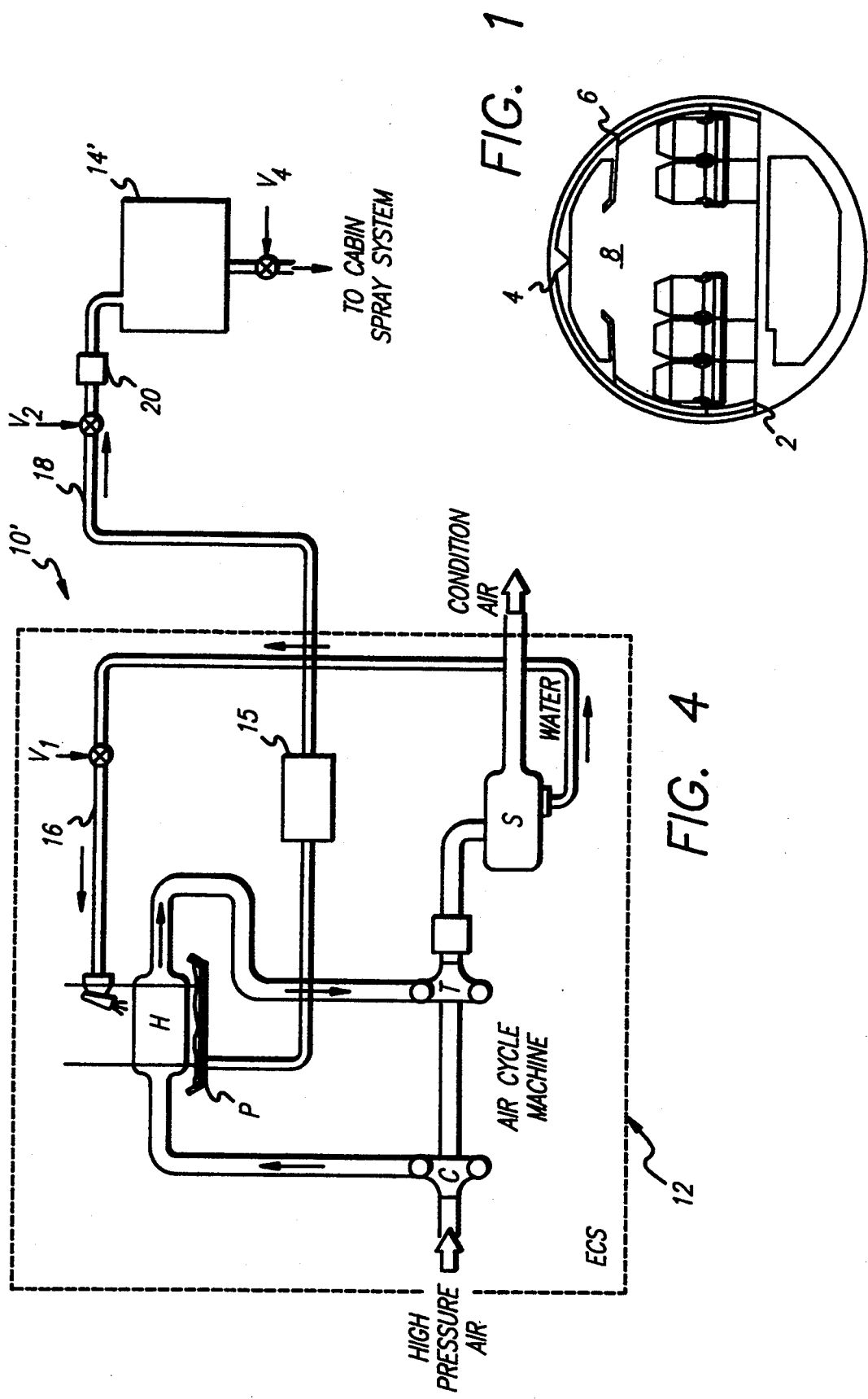
FIG. 1 is a schematic view of a cabin spray system.
Figure 2:
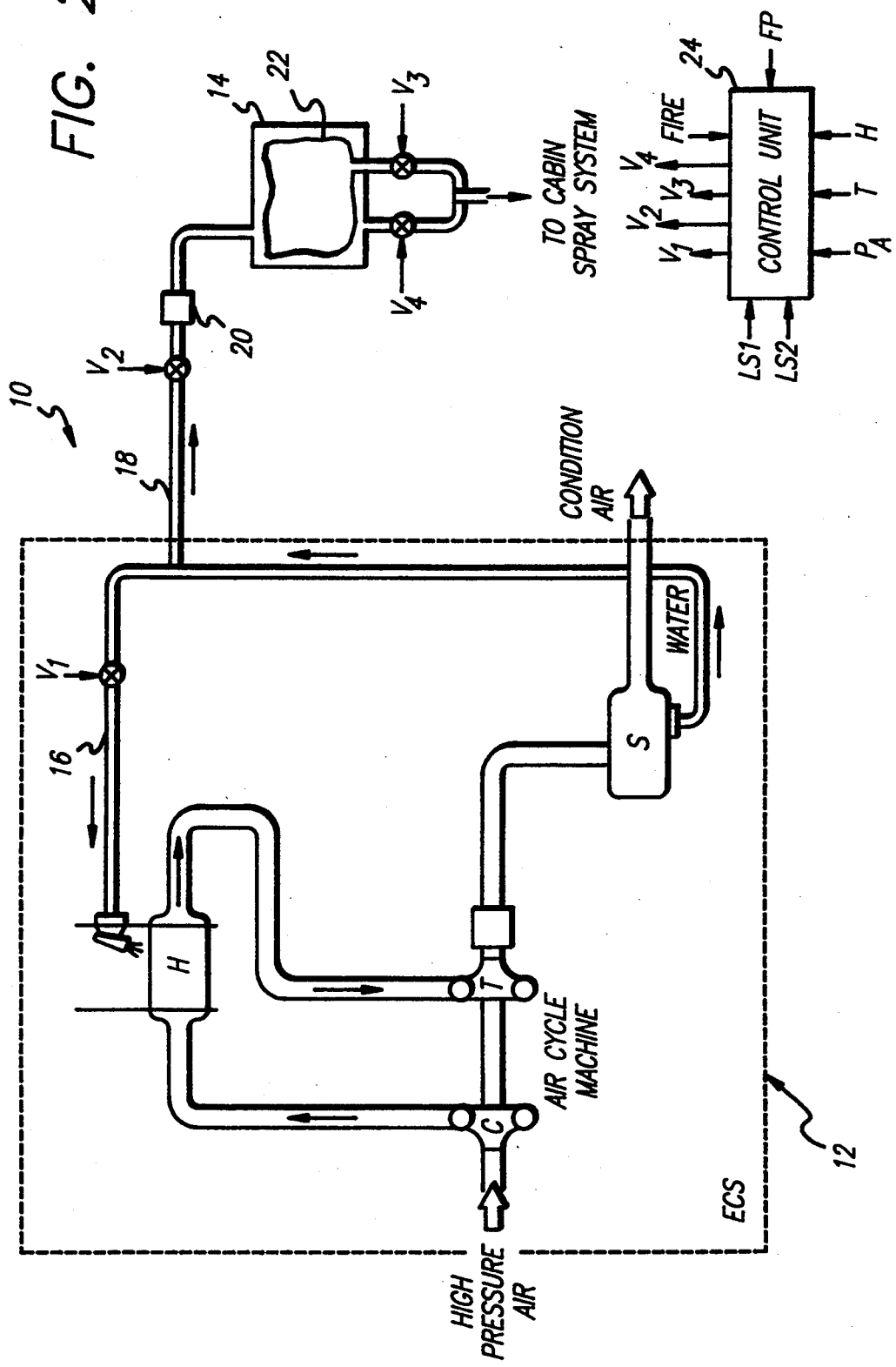
FIG. 2 is a schematic view of apparatus for supplying water to the cabin spray system.

FIG. 2 shows apparatus 10 that supplies water to a cabin spray system of an aircraft. Water is channeled from the aircraft's environmental control system (ECS) 12 to a storage tank 14.

The ECS 12 is a standard feature on an aircraft; it provides a flow of conditioned, pressurized air to cool (or heat), ventilate and pressurize an aircraft cabin. High pressure bleed air from one or more of the aircraft's engines is ducted to an air cycle machine, whose compressor C elevates the pressure of the bleed air. Heat from the compressed bleed air is removed without significant pressure drop by a heat exchanger H. The cooled bleed air is expanded in the turbine T of the air cycle machine, which expansion causes water vapor in the bleed air to condense into a fine mist at the outlet of the turbine T. The fine mist is separated from the bleed air by a water separator S. The mist and air are passed through a fabric bag which causes the mist to coalesce into water droplets. The droplets fall into a sump located at the bottom of the water separator S, and the conditioned air is supplied to the aircraft cabin.

Typically, the water collected in the sump is dumped overboard or sprayed onto the face of the heat exchanger H. According to the present invention, however, some of the ECS water is channeled to the tank 14. Water exiting the water separator S is divided into first and second flow paths 16 and 18. The first path 16 leads to the heat exchanger H. Water flowing along this path 16 is regulated by a valve V1. This valve V1 is installation specific; it is not necessarily required. Whether or not it is required depends upon the pressure drops caused by pipe diameters, flow rates and spray nozzle characteristics within the cabin spray system. A sufficiently high pressure developed by the water separator S, or by a pump downstream of the separator S, may obviate the need for the first valve V1, allowing water to be simultaneously sprayed on the heat exchanger H and supplied to the tank 14.

The second flow path 18 leads to the storage tank 14. ECS water flowing into the tank 14 is regulated by a second valve V2 and filtered by a filter 20. The filter 20 removes undissolved particles contained in the ECS water before the water is stored in the tank 14.

The tank 14 can be added to the aircraft, or it can be an existing unit that stores, for example, potable water. The potable water, is stored in an expandable bladder 22 contained within the storage tank 14. The bladder 22 isolates the ECS water from the potable water.

In the event of a fire, both the potable water and ECS water are made available to the cabin spray system. The flow of potable water is regulated by a third valve V3, and the flow of ECS water is regulated by a fourth valve V4.

FIG. 2 also shows a control unit 24 which controls the valves V1, V2, V3 and V4. The first and second valves V1 and V2 are controlled such that the tank 14 carries a minimal amount of water during flight, but is full when the aircraft lands. Such control minimizes weight during flight, thereby cutting the cost of carrying water. Although the control unit 24 can be realized by dedicated application-specific hardware, it is most cost-effectively realized by a microprocessor. The control unit 24 can be implemented as a stand alone unit that receives inputs from the airframe and/or dedicated sensors, or it can be integrated with another airframe subsystem.

The control unit 24 receives the following input signals:

| Signal | Source | Indication |
| --- | --- | --- |
| LS1 & LS2 | level sensors in bladder 22 and tank 14 | levels of potable water and ECS water |
| $P_A$ | Cabin Pressure Control System (CPCS) or Airdata Computer (ADC) | ambient pressure |
| T | CPCS or ADC | temperature of air |
| H | dedicated sensor | humidity of air |
| FP | Flight Management System (FMS), CPCS or ADC | flight profile |
| FIRE | Fire Detection System or manual input | fire alarm |

FIG. 3 shows the control logic for the control unit 24. At aircraft power up (module 100), the control unit 24 commands the first valve V1 to open and commands the other valves V2–V4 to close (module 102). Next it downloads the flight profile from the FMS (module 104) over an Arinc 429 data bus or equivalent. The flight profile allows the control unit 24 to determine the time until the aircraft lands.

Based on ambient pressure, temperature and humidity, the control unit 24 determines the amount of water in the air (module 106). Knowing the time of arrival, the control unit 24 then determines an optimum profile of weight versus time for the tank 14 (module 108). This profile allows the control unit 24 to minimize the amount of water carried in the tank 14 while ensuring that the tank 14 is full at landing. In the event a flight profile is not available, the control unit 24 ensures that the tank 14 is always full.

To ensure that the proper amount of ECS water is being carried, the control unit 24 interrogates the level sensors in the tank 14 and bladder 22 (module 110). If the tank 14 is not carrying enough water, the control unit commands the first valve V1 to close and the second valves V2 to open, allowing ECS water to flow into the tank 14. The rate at which ECS water is stored in the tank 14 must be balanced by the impact on the ECS 12. A problem occurs when water is channeled away from the heat exchanger H. Because less heat is removed from the compressed bleed air, the efficiency of the ECS 12 is reduced. However, by modulating the first and second valves V1 and V2, ECS water can be stored in the tank 14 while a sufficient amount of water is sprayed onto the heat exchanger H.

When a fire alarm is indicated (module 112), the control unit 24 opens the third and fourth valves V3 and V4, allowing potable water and ECS water to be supplied to the cabin spray system at the desired rates (module 114).

FIG. 4 shows apparatus 10' in which ECS water sprayed onto the heat exchanger H is collected in a pan P and pumped to the tank 14' by a pump 15. The tank 14' is not partitioned, i.e., it does not contain a bladder. Valves V2 and V4 regulate the flow of water to and from the tank 14'. This apparatus 10' allows ECS water to be stored in the tank 14' without reducing the efficiency of the ECS 12.

Thus disclosed are apparatus 10 and 10' that supply ECS water to a cabin spray system. The ECS water can be supplied by any type of ECS such as the low pressure water separation system of FIG. 2 or a high pressure water separation system. One such high-pressure water separation system is disclosed in application Ser. No. 07/551,334 filed on Jul. 12, 1991. Entitled "Fluid Conditioning System and Apparatus," this application is assigned to Allied-Signal, Inc., the assignee of the present invention.

It will be understood that the embodiments described herein are merely exemplary and that a person skilled in the art may make modifications and variations without departing from the spirit and scope of the invention. All such modifications and variations are intended to be included within the scope of the invention as defined in the appended claims.

I claim:

1. Apparatus for storing water for a cabin spray system of an aircraft having an environmental control system (ECS), comprising:

channeling means for channeling water from said ECS;

storing means for storing said channeled ECS water for said spray system, said storing means includes sensing means for sensing the level of water stored in said storing means; and regulating means for regulating the flow of said channeled ECS water to said storing means, said regulating means includes first valve means for controlling said flow of said channeled ECS water to said storing means, and controller means for controlling said first valve means, said controller means controls said first valve means in response to said sensing means by maintaining said stored water at a fixed level.

2. Apparatus for storing water for a cabin spray system of an aircraft having an environmental control system (ECS), comprising:

channeling means for channeling water from said ECS;

storing means for storing said channeled ECS water for said spray system;

regulating means for regulating the flow of said channeled ECS water to said storing means, said regulating means includes first valve means for controlling said flow of said channeled ECS water to said storing means, and controller means for controlling said first valve means, said aircraft further including means for providing a flight profile and means for providing signals indicating ambient pressure, temperature and humidity, wherein said storing means includes sensing means for sensing the level of water stored in said storing means; and wherein said controller means determines a storage profile of weight versus time for said stored water according to said flight profile and said signals indicating pressure, humidity and temperature, said controller means controlling said first valve means according to said flight profile.

3. Apparatus for supplying a water to a cabin spray system of an aircraft having an environmental control system (ECS), comprising:

channeling means for channeling water from said ECS;

at least one tank for storing said channeled ECS water and potable water;

storing means, contained within each tank containing said potable water, for isolating said channeled ECS water from said potable water.

first valve means for regulating the flow of said channeled ECS water to said tank;

second valve means for controlling the flow of water between said tank and said cabin spray system; and controller means for regulating said first and second valve means.

4. The apparatus of claim 3, wherein said second valve means includes a first valve for regulating the flow of said stored ECS water to said cabin spray system, and a second valve for regulating the flow of said potable water to said cabin spray system.

5. The apparatus of claim 3, said ECS including a heat exchanger that is sprayed with said ECS water, wherein said channeling means includes:

collecting means for collecting said ECS water sprayed onto said heat exchanger; and delivering means for delivering said ECS water from said collecting means to said at least one tank.

6. The apparatus of claim 3, said ECS including a water separator and a heat exchanger that is sprayed with water from said separator, wherein said first valve means includes a first valve for regulating the flow of said ECS water between said separator and said heat exchanger, and a second valve for regulating the flow of said ECS water channeled to said tank, and wherein said controller means controls said first and second valves.

7. The apparatus of claim 6, said aircraft further including means for providing a flight profile and means for providing signals indicating ambient pressure, temperature and humidity, wherein said tank includes sensing means for sensing the level of water stored in said storing means; and wherein said controller means determines a storage profile of weight versus time for said stored water according to said flight profile and said signals indicating pressure, humidity and temperature, said controller means controlling said first and second valves according to said flight profile.

8. Apparatus for supplying water to a cabin spray system of an aircraft having an environmental control system (ECS), said ECS including a water separator and a heat exchanger that is sprayed with water supplied by said separator, said apparatus comprising:

channeling means for channeling ECS water away from said heat exchanger;

at least one tank for storing said channeled ECS water;

a first valve for regulating the flow of said water that is sprayed on said heat exchanger;

a second valve, located upstream said first valve, for regulating the flow of said channeled ECS water into said at least one tank;

outlet means for controlling the flow of said stored ECS water between said at least one tank and said cabin spray system;

controller means for regulating said first and second valves; and means for providing a flight profile and means for providing signals indicating ambient pressure, temperature and humidity, wherein each said tank includes sensing means for sensing the level of stored water; and wherein said controller means determines a profile of weight versus time for said stored water according to said flight profile and said signals indicating pressure, humidity and temperature, said controller means controlling said first and second valves according to said flight profile.

9. The apparatus of claim 8, wherein at least one tank stores potable water in addition to said ECS water, and wherein said apparatus further includes storing means, contained within each tank containing said potable water, for isolating said channeled ECS water from said potable water.

10. A spray system for the cabin of an aircraft having on-board means for generating a fluid, said system comprising:

spray nozzles distributed throughout said cabin;

storing means for storing said channeled fluid and having sensing means for sensing the level of said stored fluid;

channeling means for channeling fluid from said on-board means, said channeling means including first valve means for controlling the flow of said channeled fluid into said storing means and controller means, responsive to said sensing means, for controlling said first valve means to maintain said stored fluid at a fixed level; and means for supplying said stored fluid from said storing means to said nozzles.

11. The system of claim 10, wherein said storing means also stores potable water and includes isolating means for isolating said potable water from said fluid.

12. The system of claim 10, wherein said aircraft includes means for providing a flight profile and means for providing signals indicating ambient pressure, temperature and humidity, and wherein said controller means determines a storage profile of weight versus time for said stored fluid according to said flight profile and said signals indicating pressure, humidity and temperature, said controller means controlling said first valve means also according to said flight profile.

* * * * *